United States Patent
Trapp et al.

[11] Patent Number: 6,000,432
[45] Date of Patent: Dec. 14, 1999

[54] CONTROL VALVE WITH AXIAL SEALING

[75] Inventors: Scott M. Trapp, Charlotte, N.C.;
Michael V. Kazakis, Simpsonville, S.C.

[73] Assignee: Westinghouse Air Brake Company, Wilmerding, Pa.

[21] Appl. No.: 08/978,551

[22] Filed: Nov. 26, 1997

[51] Int. Cl.⁶ ........................................... F16K 11/10
[52] U.S. Cl. .................. 137/625.66; 137/625.27
[58] Field of Search .......... 137/625.27, 625.66, 137/625.5

[56] References Cited

U.S. PATENT DOCUMENTS

| | | | |
|---|---|---|---|
| 3,794,075 | 2/1974 | Stoll et al. ........................... | 137/625.66 |
| 3,990,468 | 11/1976 | Arvin et al. ........................ | 137/625.66 X |
| 3,995,654 | 12/1976 | Arvin et al. ........................ | 137/625.66 X |
| 5,604,991 | 2/1997 | Castle et al. ........................... | 34/80 |
| 5,685,896 | 11/1997 | Castle et al. ........................... | 34/80 X |

*Primary Examiner*—Gerald A. Michalsky
*Attorney, Agent, or Firm*—James Ray & Associates

[57] ABSTRACT

A two-way control valve arrangement for selectively opening a first passageway to either one of a second passageway and a third passageway, wherein a housing structure is provided having a valve body opening with circular sidewall and a base portion intersecting the first, second and third passageways; a valve body secured within the valve body opening, and a piston with a plunged at the end thereof reciprocally disposed within a piston cylinder extending axially through the valve body, the piston being reciprocal to either bias against the valve body to close the piston cylinder therethrough and accordingly the second passageway, or to bias against the base portion of the valve body opening to close the third passageway.

8 Claims, 5 Drawing Sheets

CONTROL VALVE WITH AXIAL SEALING

CROSS REFERENCE TO RELATED APPLICATIONS

The invention taught in this patent application is closely related to the inventions taught in U.S. Pat. Nos. 5,423,129, and 5,604,991, and 5,685,896, and respectively titled "Desiccant Cartridge Of An Air Dryer" "Switching and Purging Mechanism For A Twin Tower Air Dryer", and "Linear Choke Shuttle/Orifice Check Valve Mechanism For A Twin Tower Air Dryer"; and is further closely related to the following patent applications: "E-1 Air Dryer Liquid Separator With Baffle", Ser. No. 08/978,796; "Shuttle Mechanism For Twin Tower Air Drier", Ser. No. 08/979,198now U.S. Pat. No. 5,901,459;"Purge Tube With Flapper Valve For Desiccant Containing Air Drier", Ser. No. 08/979,197; "E-1 Twin Tower Air Dryer For An Air Compressor Unit", Ser. No. 08/979,649now U.S. Pat. No. 5,901,464; all of which are being filed concurrently herewith. All of the above-referenced patent and patent applications are assigned to the assignee of this invention. Additionally, the teachings of each of those issued and co-pending patent applications is incorporated herein by reference thereto.

FIELD OF THE INVENTION

The present invention generally relates to air drying apparatus within a system for cleaning and drying compressed air. More particularly, the present invention pertains to a new and improved compressed air, two-way control valve particularly adapted for use in a twin tower compressed air cleaning and drying system in which all seals are axially arranged about a pneumatically operated piston which achieves better sealing and minimizes component wear. Furthermore, the inventive valve is easy to assemble and disassemble, easy to insert into and remove from mating components and provides optimum flow through any of the open valve ports. Additionally, the new and improved valve does not expose the internal diaphragm to any back pressure thereby prolonging the life of the internal diaphragm as compared to comparable prior art valves.

BACKGROUND OF THE INVENTION

It will be appreciated that a Westinghouse Air Brake Company C-1 air dryer is designed to remove moisture from compressed air for use in a compressed air system as utilized on railway trains, transit vehicles and the like, as necessary to operate the air brake system and air valves. U.S. Pat. No. 5,423,129, assigned to the assignee of this invention and cited above, discloses such a system wherein the compressed air is cleaned and dried by passing it through a regenerating system containing a desiccant material to absorb the moisture and filter-out particulate matter. The desiccant is regenerated by passing a small percentage of the dried air back therethrough which absorbs at least some of the moisture collected in the desiccant and is therefore discarded.

In operation, the above noted prior art air drying system (now referred to as the "single tower" system) receives compressed air from a conventional air compressor, a supply which typically contains an unacceptably high amount of moisture and other particulates suspended therein. This unpurified compressed air is caused to flow upwardly through a desiccant material usually in the form of a porous cartridge containing a porous desiccant media. The desiccant plays the key role within the single tower air drying system in that it absorbs the moisture and traps various particulates (e.g., dust, dirt, etc.) as the compressed air moves upwardly through the desiccant media. Once moisture and particulates are extracted from the air stream, the cleaned and dried compressed air continues flowing from the desiccant media through a purge check valve situated near the top of the tower. This purified compressed air then passes through a side chamber, a part of which eventually reaches a purge volume.

When the air compressor is cycled off, the system operates in a purge mode. During the purge mode, the purified pressurized air contained within the purge volume passes slowly in the reverse direction through a choke in a purge check valve and then back through the desiccant media. This slow stream of dried air reabsorbs a portion of the moisture previously collected within the desiccant media. Having evaporated into this passing stream of dry air, the evaporated moisture eventually exhausts through the sump volume to atmosphere. This gradual purging of dry air back through the system serves to dry out and thus rejuvenate or regenerate the desiccant media. When the air compressor is again cycled on, the tower system returns to operation in a drying mode, with the desiccant media then again removing moisture from the stream of unpurified compressed air passing therethrough.

More recently, a twin tower system has been proposed and developed in which a pair of desiccant containing chambers or towers are provided, each alternating back and forth between operation in drying mode and in recycle mode. Accordingly, at any given moment of operation, one tower is operating in air drying cycle while the other is operating in recycle mode or purge cycle. A pair of control valves are provided to automatically switch the flow to reverse these flow directions so that after a defined time period the cycles are reversed so that in effect a continuous operation is achieved with each tower alternately operating in drying mode permitting moisture to collect within the desiccant media while the other tower is in recycle mode removing the collected moisture from the desiccant material or media. This unique system obviously had a greater moisture removing capability and also avoids the need to have the source of unpurified air cycled-off in order to purge the desiccant material of the moisture it has accumulated, and thereby eliminate the need to temporarily deprive the pneumatic system of a steady supply of clean and dried compressed air while the compressor is turned off.

In addition to the above advantages, the switching of the two drying assemblies alternately between the drying and the purging modes allows the twin tower system to exsiccate the air stream more efficiently than the prior art single tower system. Two desiccant towers rather than one are employed in the air drying system with one absorbing moisture while the other is being purged of it. The switching of the two drying assemblies alternately between the drying and the purging modes thus serves to continuously purge moisture from the twin tower system. More fully desiccated air is thus supplied to the pneumatic system. The amount, density and overall surface area of the desiccant can also be selected to suit varying needs.

The twin tower system can be applied to a wide variety of pneumatic systems. Typical of the types of pneumatic systems to which the twin tower system could be applied include the pneumatic brake systems of passenger and freight railroad trains, subway trains and various other types of rail related transportation systems. Further examples include the pneumatic brake systems of various truck transport vehicles. Other types of pneumatic systems to which the twin tower system could be applied may be found outside the transportation field.

Another disadvantage of the single tower air drying system is that it is only capable of removing a certain, limited amount of moisture during the purge mode. Because the volume of unpurified air flowing into the system to be dried vastly exceeds the volume of purified air used to purge the desiccant media, the desiccant media never adequately exsiccates during operation of the single tower system. Indeed, the desiccant media adequately exsiccates only after the system has been turned off for a prolonged time sufficient to accomplish same. While the twin tower system has a greatly increased water removing capacity, the control valves utilized in that existing system have not been trouble-free. In particular, the non-symmetrical nature of the of the valve element, and particularly the seals thereon, tended to cause uneven wear requiring frequent seal replacement, and the fluid motion within the valve body has tended to expose the diaphragm to considerable back pressure shortening the life of the valve and adversely effecting it reliability.

SUMMARY OF THE INVENTION

This invention is predicated upon our conception and development of a new and improved two-way control valve for selectively opening a first passageway to either one of a second passageway or a third passageway, and is ideally suited for use in a twin tower compressed air cleaning and drying system for delivering the moist compressed air to the desiccant containing tower for filtering and moisture removal to effect the moisture removal cycle, and in the alternative to vent the recycled purge air to atmosphere during the desiccant purge cycle. In the inventive valve, all seals are axially arranged about a pneumatically operated, reciprocating piston which achieves better sealing and minimizes component wear. Furthermore, the inventive valve is easy to assemble and disassemble, easy to insert into and remove from mating components and provides optimum flow through any of the open valve ports. Additionally, the new and improved valve does not expose the internal diaphragm to any back pressure thereby prolonging the life of the internal diaphragm as compared to comparable prior art valves.

In essence, therefore, a presently preferred embodiment of the two-way control valve of this invention comprises a housing structure having a valve body opening, with the valve body opening having sidewall portions and a base portion, with a first passageway emerging through a sidewall portion adjacent to the base portion, a second passageway emerging through a the sidewall portion displaced from the base portion and a third passageway emerging through the base portion. A valve body is secured within the valve body opening, with an internal end thereof disposed between the first passageway and the second passageway. A piston is reciprocally disposed within a piston cylinder extending axially through the valve body, such that the piston cylinder is in communication with the third passageway. A spring biased plunger is disposed at an inner end of the piston adjacent to the base portion which is adapted to bias against the valve body, closing the piston cylinder and the second passageway from the first passageway, thereby opening the third passageway to the first passageway, when the piston is reciprocated outwardly with respect to the piston cylinder; and in the alternative is further adapted to bias against the base portion, closing the third passageway from the first passageway, thereby opening the piston cylinder and the second passageway to the first passageway, when the piston is reciprocated inwardly with respect to the piston cylinder.

While it is believed that the control valve as described above is unique and novel in and of itself, its incorporation into a compressed air filtering and drying system utilizing a desiccant as described above, is also unique and novel in that one single valve can be provided for each desiccant containing tower to pass the unfiltered, moist air to the desiccant tower for filtering and drying the compressed air, and also to open and vent the desiccant tower to permit egress of the purge air during the desiccant purge cycle. Indeed, the combination of the unique and improved control valve of this invention within a twin tower, or even a single tower, air drying system utilizing a desiccant, has been shown to lead to prolonged trouble-free operation. Accordingly, the combination provides a much improved system without adding significantly to the cost thereof, or adding any complicated parts which would add to the cost of maintenance.

OBJECTS OF THE INVENTION

It is, therefore, a primary object of the present invention to provide a new and improved valve for selectively opening a first passageway to either one of a second passageway or a third passageway.

Another object of this invention is to provide a new and improved control valve for selectively opening a first passageway to either one of a second passageway or a third passageway in which all seals are axially arranged about a pneumatically operated piston to achieves better sealing and minimize component wear.

A further object of this invention is to provide a new and improved control valve for selectively opening a first passageway to either one of a second passageway or a third passageway which is easy to assemble and disassemble, easy to insert into and remove from mating components and provides optimum flow through any of the open valve ports.

It is still another object of this invention to provide a new and improved pneumatically controlled control valve for selectively opening a first passageway to either one of a second passageway or a third passageway which does not expose the internal diaphragm to any back pressure thereby prolonging the life of the internal diaphragm as compared to comparable prior art valves.

In addition to the above-described objects and advantages of the control valve of this invention, various other objects and advantages of the present invention will become more readily apparent to those persons who are skilled in the same and related arts from the following more detailed description of the invention, particularly, when such description is taken in conjunction with the attached drawing figures and the appended claims.

DETAILED DESCRIPTION OF A PREFERRED EMBODIMENTS OF THE INVENTION

Before describing the present invention in detail, it should be noted that for the sake of clarity and understanding, identical components having identical functions in each of the accompanying drawings have been marked with the same reference numerals throughout each of the several Figures illustrated herein.

Figure 1:
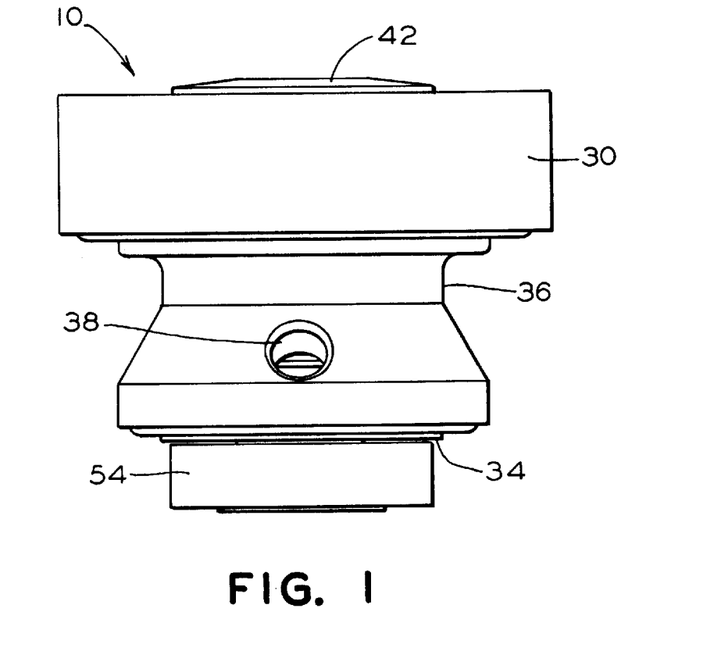
FIG. 1 is an elevational side view of a presently preferred embodiment of the control valve of this invention.
Figure 2:
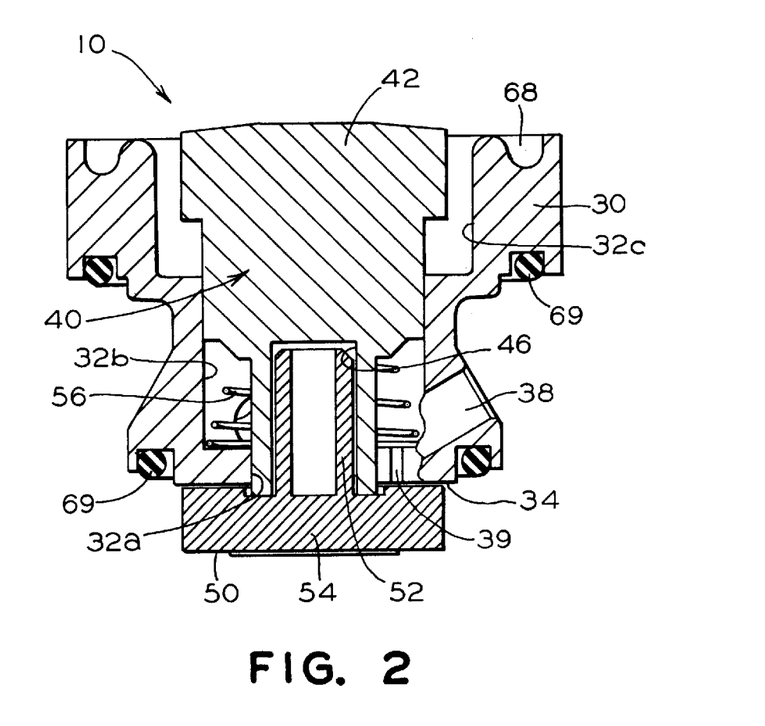
FIG. 2 is a cross-sectional side view of the control valve shown in FIG. 1.
Figure 3:
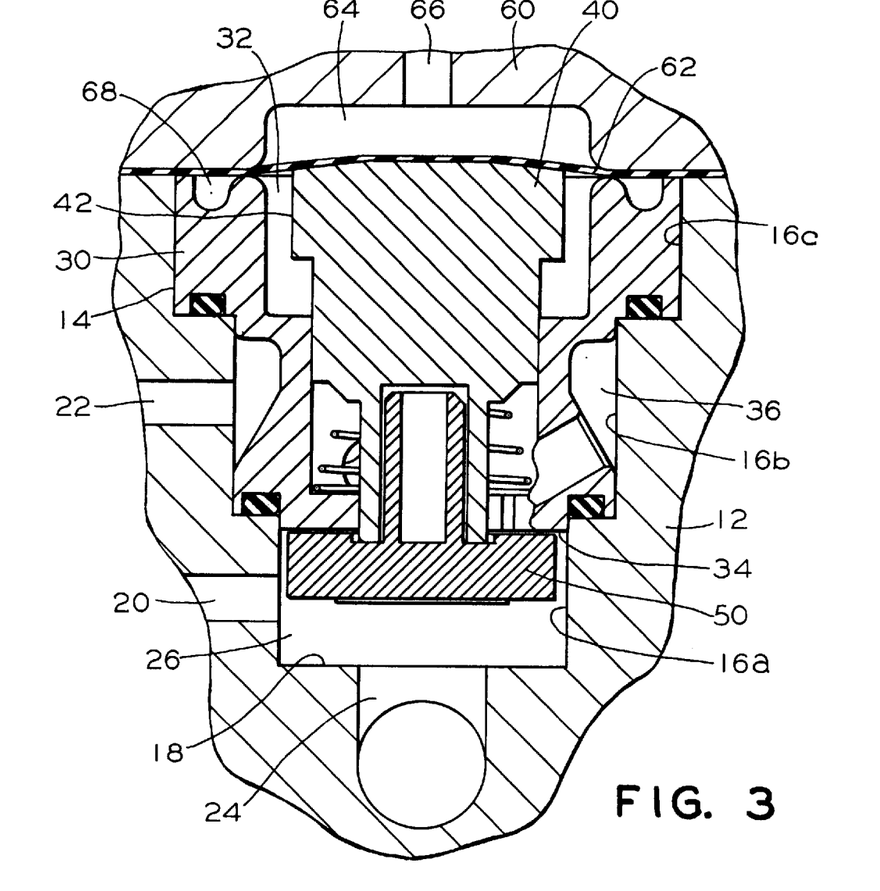
FIG. 3 is a cross-sectional side view substantially the same as FIG. 2 but showing the valve as inserted within a housing structure through which the valved passageways are provided.

Reference to FIGS. 1–4 will illustrate a presently preferred embodiment of the control valve of this invention, generally designated 10, for selectively opening a first passageway to either one of a second passageway or a third passageway. As shown in FIG. 3, the control valve 10 is insertable through the surface of a housing structure 12 through which the first, second and third passageways are interconnected. Specifically, the housing structure 12, which may be the main structural body of a twin tower air drier, is provided with a valve body opening 14, defined by generally cylindrical sidewall portions 16 and a circular base portion 18. As further shown in FIG. 3, there are three cylindrical sidewall portions having a common axis, a small diameter portion 16a at the base or inside end of opening 14 adjacent to base portion 18, a large diameter portion 16c at the outer end of valve body opening 14, and an intermediate-sized diameter portion 16b intermediate the two portions 16a and 16c. A first passageway 20 emerges through a sidewall portion 16a adjacent to the base portion 18 and into cylindrical chamber 26 adjacent to base portion 18, the second passageway 22 emerges through the sidewall portion 16b generally mid-way between portions 16a and 16c, somewhat displaced from the base portion 18, while the third passageway 24 emerges through said base portion 18, preferably at the axial center thereof.

Figure 4:
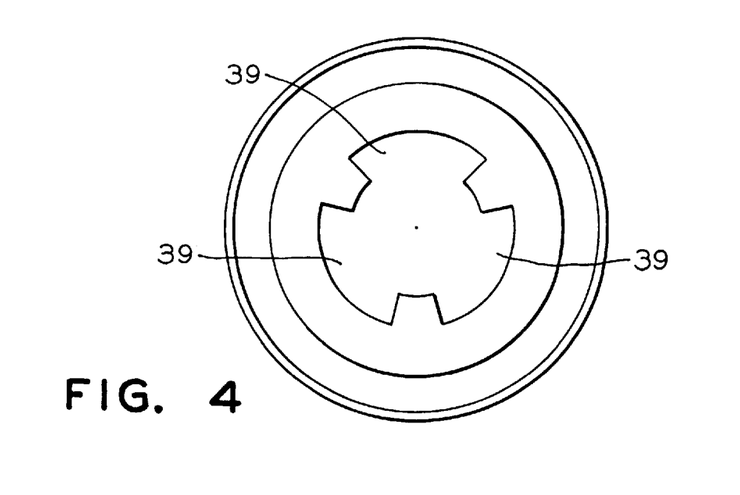
FIG. 4 is a bottom view of the valve body without the piston or plunger in place so that the configuration of the aperture through the bottom of the piston cylinder can be seen more clearly.

A fixed valve body 30 having a generally circular opening 32 therethrough, is secured within the valve body opening 14, such that the internal end thereof 34, is disposed between the first passageway 20 and the second passageway 22, and spaced from base portion 18 sufficient to provide cylindrical chamber 26 at the end thereof. An annular channel 36 is provided around valve body 30 such that second passageway 22 opens into annular channel 36. As shown in FIGS. 2 and 4, a plurality of uniformly spaced radial ports 38 at an angle to the axis, are provided to extend from circular opening 32 into annular channel 36.

Circular opening 32 defines three separate cylindrical portions axially disposed through valve body 30, namely, a piston cylinder 32b sized to receive a reciprocating piston 40 having a head portion 42 at the outer end thereof, a larger cylindrical portion defining chamber 32c into which head portion 42 of piston 40 can reciprocate, and a small diameter portion 32a at the base thereof adjacent to cylindrical chamber 26 and spaced from base portion 18 of valve body opening 14 into which the inside end 44 of piston 40 can reciprocate. As shown in FIG. 4, the small diameter portion 32a is provided with a plurality of uniformly spaced slots 39, which are preferably aligned with radial ports 38.

Piston 40 is provided with a cylindrical aperture 46 in the inside end thereof adapted to reciprocally receive stem 52 of plunger 50. Plunger 50 is also provided with an outer disk portion 54 axially attached to and aligned with stem 52. A compression spring 56 is disposed around the smaller inside end 48 of piston 40 between the piston portion 40 and the smaller end 32a of circular opening 32, adapted to bias piston 40 outwardly with reference to valve body 30. As can be seen, when piston 40 and plunger 50 are reciprocated outwardly, as a result of the biasing action of spring 56, the undersurface of disk portion 54 adjacent to stem 52 is adapted to be biased against internal end 34 of valve body 30, and against the edge of small diameter portion 32a of opening 32. Hence, plunger 50 is tightly positioned against the cylindrical opening 32 of valve body 30 thereby sealing circular opening 32 from cylindrical chamber 26. Conversely, when piston 40 and plunger 50 are reciprocated inwardly with reference to valve body 30, the outside surface of disk portion 54 is adapted to be biased against base portion 18 of valve body opening 14, thereby sealing the third passageway 24 from cylindrical chamber 26.

As shown in FIG. 3, a closure member 60 is attachable to the outer surface of housing structure 12 for the purpose of closing chamber 32c, with a diaphragms 62 sandwiched therebetween creating a valve control chamber 64 between closure member 60 and diaphragm 62. A valve control port 66 is provided through closure member 60 for purposes or admitting pressurized air into control chamber 64 as necessary to cause piston 40 to be reciprocated inwardly. An annular recess 68 is provided around circular opening 32c adapted to receive an O-ring seal (not shown) for purposes of locking the diaphragm 62 in place and making control chamber 64 air tight. In a like manner, O-ring seals 69 are provided to seal between cylindrical sidewall portions 16a and 16b, and between 16b and 16c.

As may be apparent, piston 40 is caused to reciprocate against edge 34 of valve body 30, thereby closing the slots 39, and accordingly, closing off passageway 22 from chamber 26 by the expanding action of spring 56 when no compressed air is admitted into control chamber 64 via control port 66. However, when compressed air is admitted into control chamber 64, via control port 66, piston 40 is caused to be forced in the opposite direction so that plunger disk 54 is biased against base 18, thereby closing-off passageway 22 from passageway 24. Compressed air emerging from passageway 24 will keep stem 52 fully biased into the aperture in the end of piston 40. Obviously, it is intended that the plunger 50 will reciprocate fully with piston 40, except to the extent that it may become biased against the inside edge 34 of valve body 30 as it closes the slots 39, and accordingly, closes-off passageway 22 from chamber 26. Protruding ring portions may be provided on the two faces of plunger disk 54 to achieve better seals.

Figure 5:
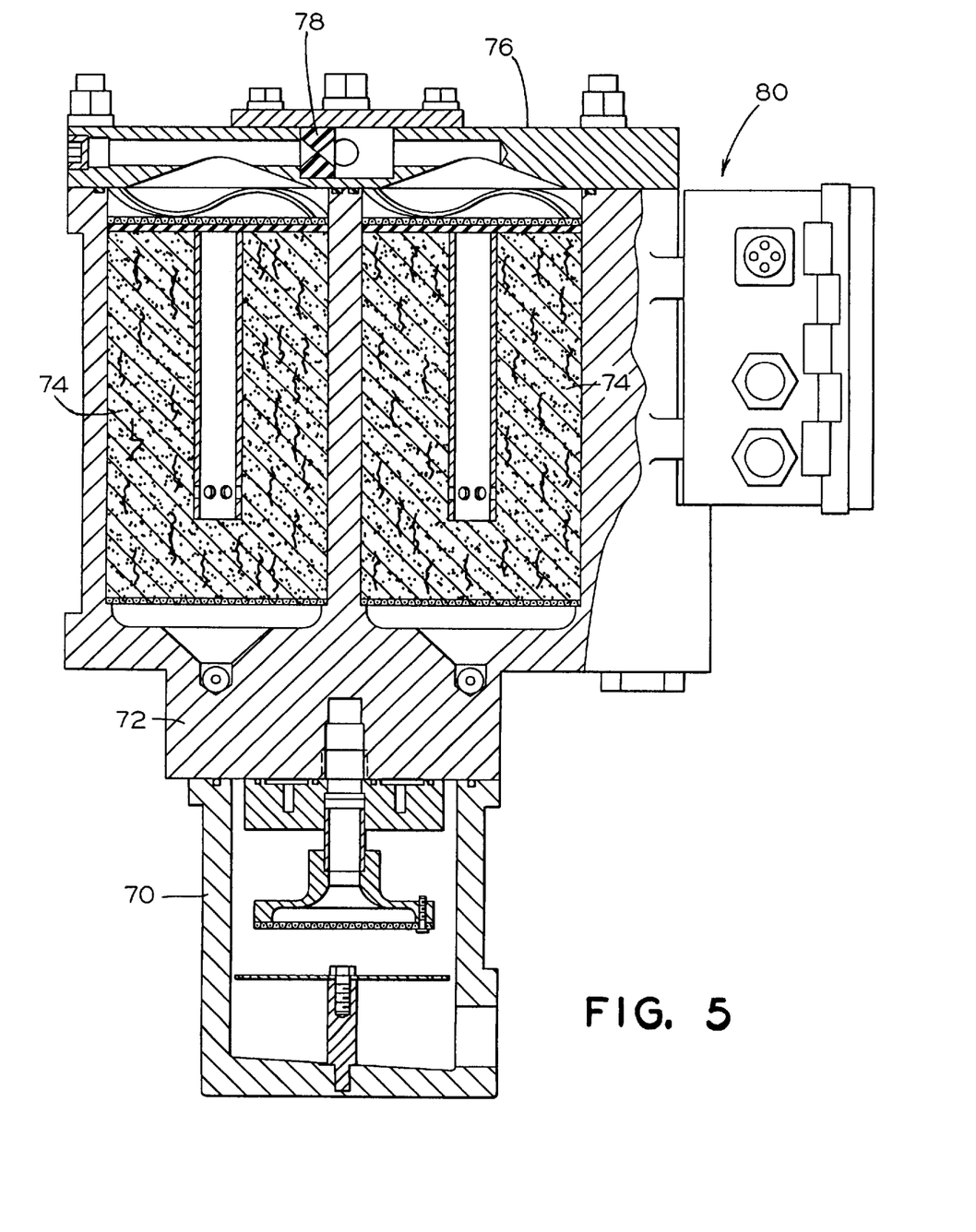
FIG. 5 is a cross-sectional elevational view of a presently preferred embodiment of a twin tower, compressed air filtering and drying system incorporating control valves pursuant to this invention (only one such valve is shown).
Figure 6:
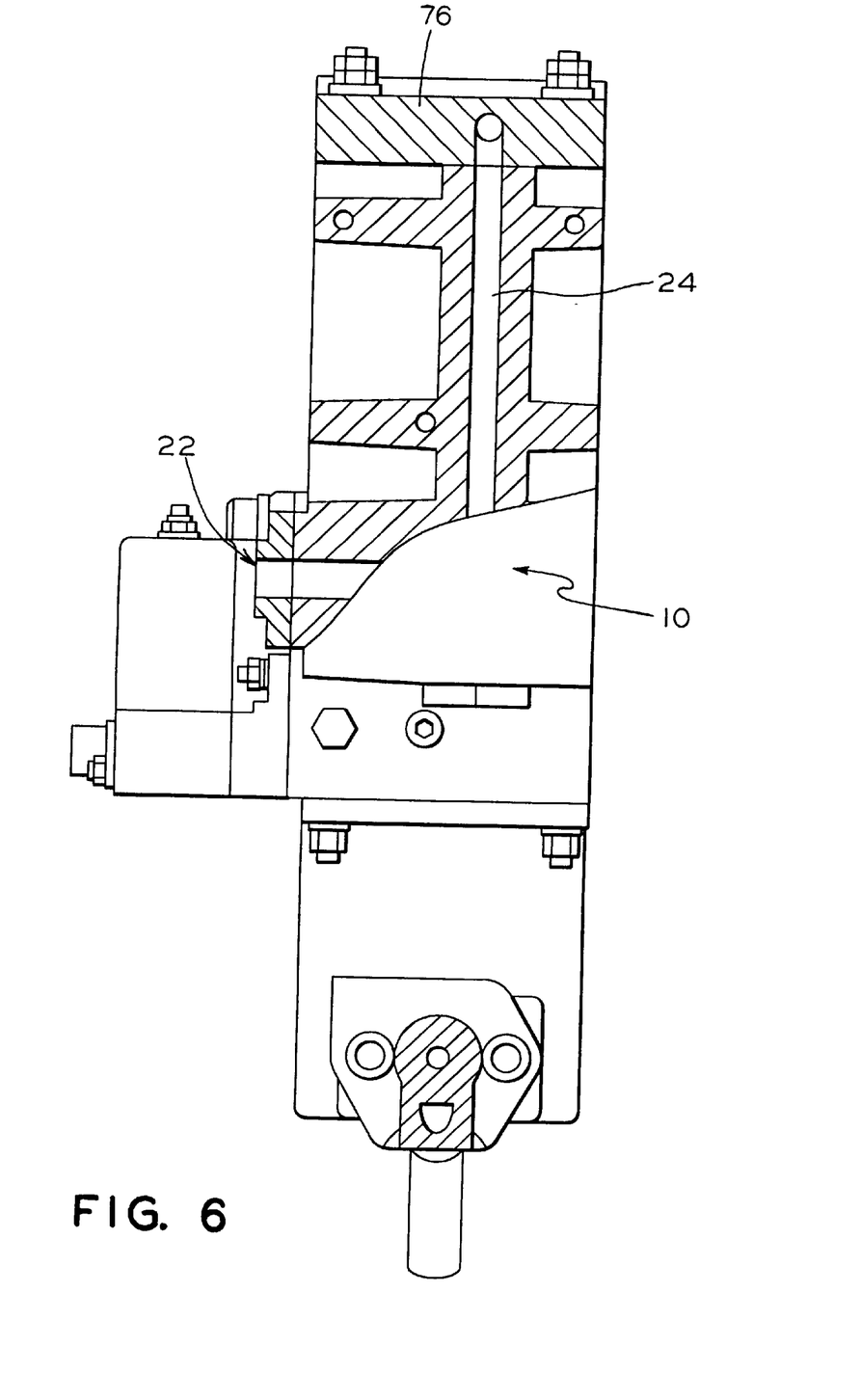
FIG. 6 is a cross-sectional side view of the twin tower system shown in FIG. 4.
Figure 7:
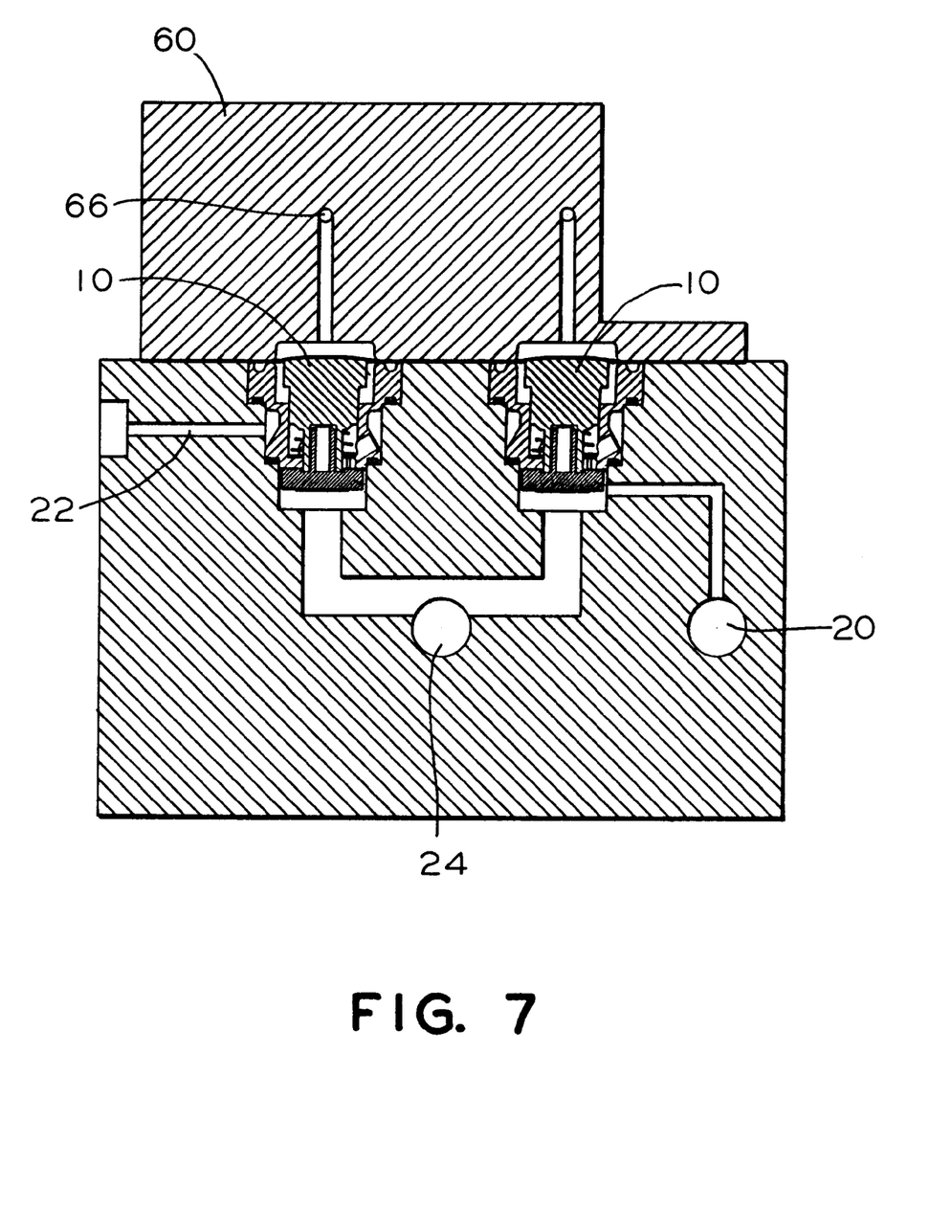
FIG. 7 is a cross-sectional bottom view of the twin tower system shown in FIGS. 4 and 5 better illustrating how the various ports are interconnected through the two control valves of this invention.

Reference to FIG. 5–7 will illustrate how the control valves 10 of this invention are incorporated into a twin tower air cleaning system as disclosed in the above-cited U.S. Pat. Nos. 5,423,129; 5,604,991; and 5,685, 896. The prior art twin tower air cleaning system was designed to clean and dry a stream of unpurified pressurized air received from a source of compressed air such as an air compressor so as to supply a pneumatic system with purified dry air. The unpurified compressed air from a conventional air compressor typically contain the vapor of various substances as well as moisture in the form of water or other liquids such as various oils. For the sake of brevity, the terms vapor and moisture are herein collectively referred to as "moisture." The unpurified air will also typically contain other particulates such as dirt, dust, pollen and various other contaminants.

Reference to FIGS. 5–7 will illustrate the twin tower air drying system incorporating the control valve 10 of this invention wherein the system normally includes a separating means 70, such as a centrifugal water remover, a base housing member 72 containing a pair of chambers or towers 74, each having desiccant material therein, a pair of control valves 10 (only one is shown) in accordance with this invention, and a cover member 76, containing the shuttle valve mechanism 78. Described summarily, the twin tower air drying system cleans and dries unpurified, moist air received from a source of pressurized air such as a conventional air compressor (not shown) to supply purified air to a pneumatic system (not shown). Typically, the compressed air is first passed through a water separator 70, such as a centrifugal separator where a large portion of the moisture is first removed mechanically from the compressed air before it is subjected to moisture removal by virtue of the desiccant. Through the function of the control valves 10 of this invention, the unpurified, moist air from the separating means 70 is supplied alternately to the desiccant containing chambers 74 where it is filtered and further dried by virtue of passing the compressed air through a particulate desiccant media contained within the two chambers 74.

While the desiccant media can be loosely charged within the two chambers 74, it is preferably provided within a porous cartridge or fabric bag within which the desiccant media is charged. The particulate desiccant media is preferably contained within the porous cartridge or fabric bag completely filling same and of such size and configuration as to snugly fit within the chambers 74 to avoid any open spaces therearound through which air could pass without passing through the desiccant media. It should be understood that at any given moment of operation, the compressed, moist air is allowed to enter only one of the chambers 74 for the purpose of filtering the compressed air through the desiccant media while the desiccant media removes moisture from the compressed air moving upwardly therethrough. While the compressed, moist air is being filtered and dried in one of the two chambers 74, as described, the other of the two chambers 74 is operating in the purge cycle whereby a portion of the filtered and dried compressed air is allowed to pass in the reverse direction, downwardly through the desiccant media within that other chamber 74 for the purpose of removing moisture from the desiccant media within that chamber 74.

A timer control 80 is provided to intermittently operate the two control valves 10 such that one is opened to permit the flow of compressed, moist air upwardly through one of the chambers 74, and the desiccant media therein, while the other of the two control valves 10 is closed to prevent such flow. At periodic intervals, the timer control 80 will close the valve 10 which was previously open and then open the other valve 10 which was previously close, thereby changing the flow of compressed, moist air to the other chamber 74. Accordingly, the compressed, moist air is filtered and dried in a continuous operation whereby the flow is alternated back and forth between the two desiccant containing chambers 74. Obviously, an outlet means must be provided to permit egress of the purge air from the two chambers 74 while operating in the desiccant purge cycle. With the control valves 10 of this invention, this is accomplished with those control valves 10 which not only feed the unfiltered moist air to the chambers 74, but further vent the purge air to atmosphere when it is closed to admitting moist air to the chamber 74 during the air drying cycle.

The shuttle valve mechanism 78 within the cover member 76 is adapted to direct the filtered and dried air emerging from the desiccant containing chamber 74, functioning in the air drying cycle, to the pneumatic system for use as intended, while at the same time allowing a purge percentage of the dried air to be admitted into the other of the desiccant containing chambers 74 for the purpose of effecting the desiccant purge cycle. Accordingly, the control valve 10 associated with that desiccant containing chamber 74 must vent the purge air to atmosphere.

In normal operation, within a twin tower compressed air filtering and drying system, it is intended that one of the control valve 10 be maintained in the open position, that is to say, the piston 40 is biased to the left with plunger 50 closing circular opening 32, while the other control valve 10 is maintained in the closed position. In open position, the third passageway 24 emerging through base portion 18, is open to cylindrical chamber 26 thereby permitting passage of the moist air from the centrifugal separator 70, into the associated desiccant containing cylindrical chamber 74 via the first passageway 20. The other valve 10 being in the closed position, has the piston 40 biased to the right, with the outer flat surface of plunger 50 biased against base portion 18, thereby closing the third port 24 from cylindrical chamber 26. In this position, however, plunger 50 is spaced away from valve body 30 thereby opening the small end 32a of cylindrical opening 32 to cylindrical chamber 26 as well as to the first passageway 20. Accordingly, the recycled purge air being fed into the associated desiccant containing chamber 74 (i.e., that chamber operating in the desiccant purge cycle) is allowed to egress via the first passageway 20 into cylindrical chamber 26 where it can escape to atmosphere via radial slots 39, radial ports 38, annular chamber 36 and out through the second passageway 22. At periodic intervals the timer control 80 will close the control valve 10 which had previously been open as described above, and at the same time open the other control valve 10, so that the air passages through the desiccant containing chambers 74 are reversed.

Having disclosed one embodiment of the control valve of this invention, it should be apparent that a number of different embodiments and modifications could be devised and incorporated without departing from the spirit of the invention.

We claim:

1. A three-way, two-position control valve arrangement for selectively opening a first passageway to but one of a second passageway and a third passageway, said control valve arrangement comprising:

(a) a housing structure having a valve body opening, said valve body opening having sidewall portions and a base portion, with said first passageway emerging through a said sidewall portion adjacent to said base portion, said second passageway emerging through a said sidewall portion displaced from said base portion and said third passageway emerging through said base portion;

(b) a valve body secured within said valve body opening, said valve body having an internal end disposed between said first passageway and said second passageway and a middle portion around which is defined an annular channel, said internal end of said valve body defining a plurality of slots therethrough;

(c) a piston reciprocally disposed within a piston cylinder extending axially through said valve body, said piston cylinder at one end thereof in communication with said third passageway and at the other end thereof having a control chamber in which control pressure is received to move said piston reciprocally within said piston cylinder;

(d) at least one radial port extending through a wall of said valve body adapted to provide communication between said second passageway and an intermediate cylindrical portion of said piston cylinder via said annular channel in said valve body; and (e) a plunger disposed at an inner end of said piston adjacent to said base portion, adapted to bias against said internal end of said valve body, closing said slots and thus said piston cylinder and said second passageway from said first passageway, thereby opening said third passageway to said first passageway, when said piston is reciprocated outwardly with respect to said piston cylinder; and further adapted to bias against said base portion, closing said third passageway from said first passageway, thereby opening said slots and thus said piston cylinder and said second passageway to said first passageway, when said piston is reciprocated inwardly with respect to said piston cylinder.

2. A three-way, two position control valve arrangement, according to claim 1, in which said piston is pneumatically operated.

3. A three-way, two position control valve arrangement, according to claim 2, in which said piston is provided with a head portion contained within a chamber with a diaphragm separating said chamber from a head containing portion and a pressurized air inlet portion for pneumatically operating said control valve arrangement.

4. A three-way, two position control valve arrangement, according to claim 3, in which said valve body opening comprises a outer cylindrical portion having a given diameter adapted to receive said valve body, an inner cylindrical portion having a diameter smaller than said given diameter adapted to receive said plunger, and a first annular flange portion separating said outer cylindrical portion from said inner cylindrical portion.

5. A three-way, two position control valve arrangement, according to claim 4, in which said valve body is provided with a second annular flange portion adapted to mate with said first annular flange portion of said valve body opening, said second annular flange containing an O-ring seal for sealing said first passageway from said second passageway.

6. A three-way, two position control valve arrangement, according to claim 4, in which said valve body opening includes an extreme outer cylindrical portion having a diameter greater than said given diameter adapted to receive said valve body, and a second annular flange portion separating said outer cylindrical portion from said extreme outer cylindrical portion, with said valve body provided with a third annular flange portion adapted to mate with said second annular flange portion of said valve body opening, said third annular flange containing an O-ring seal for sealing said second passageway from atmosphere outside of said valve body opening.

7. A three-way, two position control valve arrangement, according to claim 1, in which said plunger comprises a cylindrical end-cap portion and an axial stem portion and said inner end of said piston comprises a narrow extension portion having an axial opening adapted to receive said axial stem portion of said plunger.

8. A three-way, two position control valve arrangement, according to claim 7, further including a spring element intermediate said piston and said plunger adapted to bias said plunger squarely against said valve body to positively close said second passageway from said first passageway when said piston is disposed reciprocally outward with respect to said piston cylinder.

\* \* \* \* \*